July 14, 1931.   J. W. MOTHERWELL   1,814,092
PRESSURE GAUGE
Original Filed May 23, 1924
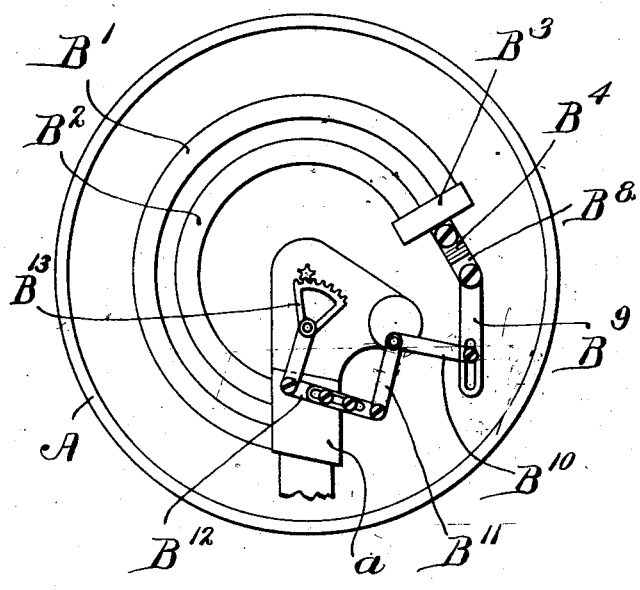
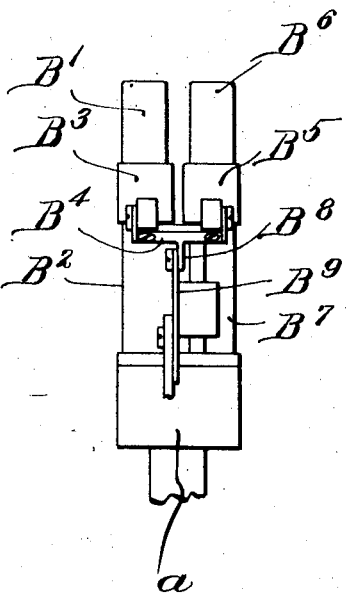
Inventor:
Joseph W. Motherwell
by George A. Rockwell,
atty.

Patented July 14, 1931

1,814,092

UNITED STATES PATENT OFFICE

JOSEPH W. MOTHERWELL, OF MELROSE, MASSACHUSETTS, ASSIGNOR TO THE ASHTON VALVE COMPANY, OF CAMBRIDGE, MASSACHUSETTS, A CORPORATION OF MASSACHUSETTS

PRESSURE GAUGE

Original application filed May 23, 1924, Serial No. 715,399. Divided and this application filed October 1, 1929. Serial No. 396,556.

The principal object of my invention is to provide a pressure gauge having great accuracy particularly in cases where considerable strength and considerable flexibility are desirable, especially for large gauges and where wide ranges between increments of pressure are to be indicated, or in other words where large arcs for small ranges of pressure are to be indicated.

A feature of my invention is a plurality of concentric Bourdon spring tubes all connected with the same source of pressure and having their movable ends rigidly connected by a head and contributing their joint movement to the movement of the indicator, one object of using a plurality of such tubes being to provide more sensitiveness and flexibility together with increase of strength than is possible with one tube and an advantage is that, although the strength is increased, accuracy and efficiency are maintained.

In the drawings

Figure 1 is a front elevation of a gauge embodying my invention, the dial and outer parts being omitted; and Figure 2 is a side elevation of the same but without some of the parts.

Gauge casing A has within it socket $a$ leading from the source of pressure to four Bourdon spring tubes each having one end fixed to the socket and each having a closed movable end, that is, there is no conduit for the passage of pressure from one movable end to any other movable end. Two of these springs $B'$ and $B^2$ are concentric and have their movable ends rigidly connected by a head $B^3$ having pivotal connection with bracket $B^4$, the latter having also pivotal connection with head $B^5$ which rigidly connects together the movable ends of tubes $B^6$ and $B^7$. From bracket $B^4$ depends lug $B^8$ pivotally connected to link $B^9$ which has slotted connection with arm $B^{10}$ of a bell crank lever which is pivoted to an extension of socket $a$, the other arm $B^{11}$ being pivotally connected to link $B^{12}$, which may be adjustable if desired, link $B^{12}$ being pivotally connected to the rocking segment $B^{13}$ which, as is well known in the art, operates the indicating pointer.

The tubes $B'$ and $B^2$ may move as a unit separate from the tubes $B^6$ and $B^7$.

The motion of the ends of a concentric pair of the tubes is determined by the pressure within the tubes, by the elastic constants of the tubes and by the connecting head.

The center line of the link $B^9$ is parallel to the tangent to the locus of the movable end deflection at a point midway between the points of no load and maximum load. The movable ends of the tubes all occupy normally substantially the same position radially of the gauge and are actuated by the same pressure with the consequence that the movable ends will tend to move outwardly in such manner that the center line of the link will be parallel to the tangent above referred to whereas, if the tubes are of substantially different arcuate length, their movable ends will tend to move outwardly in varying directions and each movable end will consequently tend to hinder or impede the independent action of the other movable ends. This independent action is an advantage of the parallelism of the link $B^9$ referred to above and another important advantage thereof is that it contributes to obtaining the benefit of the maximum travel of the tubes.

What I claim is:

1. A device of the character described comprising a plurality of concentric arcuate spring tubes to be connected with the same source of pressure and each having a fixed end and a closed movable end, each movable end being closed also with relation to the other movable end or ends; a head rigidly connecting the movable ends of said plurality; a rocking element for operating an indicator; and means operatively connecting said head and said rocking element.

2. A device of the character described comprising a plurality of concentric arcuate spring tubes to be connected with the same source of pressure and each having a fixed end and a closed movable end; a head rigidly connecting the movable ends of said plurality; another plurality of concentric spring tubes connected with said source of pressure and each having a fixed end and a closed movable end; another head rigidly connecting the movable ends of said other plurality; a rocking element for operating an indicator; and means operatively connecting said heads and said rocking element.

3. A device of the character described comprising a plurality of concentric arcuate spring tubes, all to be connected with the same source of pressure and each having a fixed end and a closed movable end, each movable end being closed also with relation to the other movable end or ends, said movable ends being normally substantially in line radially of the device; a head rigidly connecting the movable ends of said plurality; a rocking element for operating an indicator; and means operatively connecting said head and said rocking element.

4. A device of the character described comprising a plurality of concentric arcuate spring tubes, all to be connected with the same source of pressure and each having a fixed end and a closed movable end, each movable end being closed also with relation to the other movable end or ends, said tubes having their dimensional characteristics relatively so proportioned that their movable ends remain substantially in the same position radially with relation to the center of the device throughout the movement of the tubes; a head rigidly connecting the movable ends of said plurality; a rocking element for operating an indicator; and means operatively connecting said head and said rocking element.

5. A device of the character described comprising a plurality of concentric arcuate spring tubes to be connected with the same source of pressure and each having a fixed end and a closed movable end, each movable end being closed also with relation to the other movable end or ends; a head rigidly connecting the movable ends of said plurality; a rocking element for operating an indicator; and means operatively connecting said head and said rocking element and including a link the center line of which is substantially parallel to the tangent to the locus of the movable end deflection at a point midway between the points of no load and maximum load.

6. A device of the character described comprising a plurality of concentric arcuate spring tubes to be connected with the same source of pressure and each having a fixed end and a closed movable end, each movable end being closed also with relation to the other movable end or ends; a head rigidly connecting the movable ends of said plurality; a rocking element for operating an indicator; and means operatively connecting said head and said rocking element, said means including a plurality of elements movable with relation to each other.

7. A device of the character described comprising a plurality of concentric arcuate spring tubes to be connected with the same source of pressure and each having a fixed end and a closed movable end, each movable end being closed also with relation to the other movable end or ends; a head rigidly connecting the movable ends of said plurality; a rocking element for operating an indicator; and means operatively connecting said head and said rocking element, said means including a plurality of elements movable with relation to each other, one of said plurality of elements being a link, the center line of which is substantially parallel to the tangent to the locus of the movable end deflection at a point midway between the points of no load and maximum load.

8. A device of the character described comprising a plurality of concentric arcuate spring tubes to be connected with the same source of pressure and each having a fixed end and a closed movable end; a head rigidly connecting the movable ends of said plurality; another plurality of concentric spring tubes connected with said source of pressure and each having a fixed end and a closed movable end; another head rigidly connecting the movable ends of said other plurality; a rocking element for operating an indicator; and means operatively connecting said heads and said rocking element, said means including a plurality of elements movable with relation to each other.

JOSEPH W. MOTHERWELL.